Figure 1:
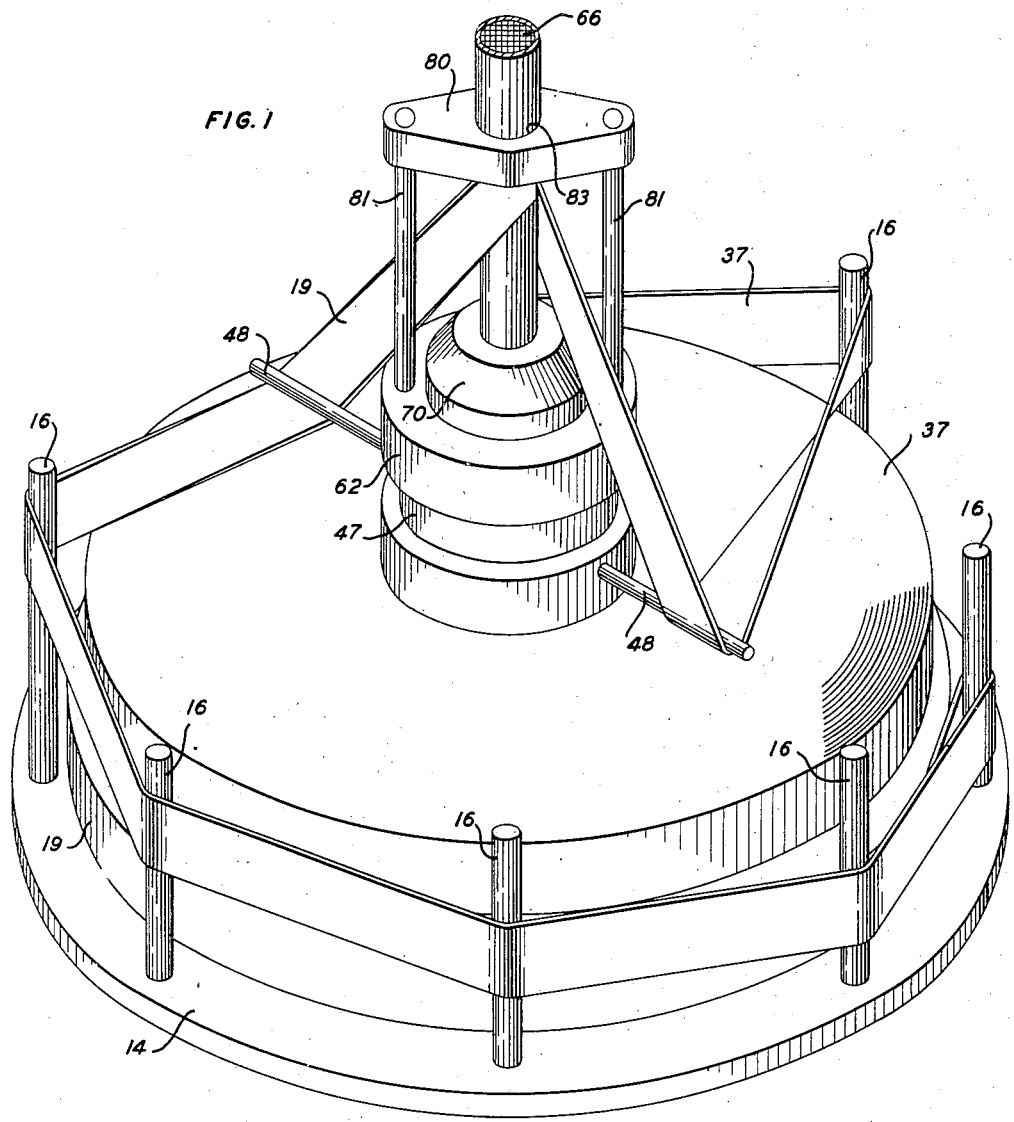

March 1, 1949.  G. C. SPILLMAN  2,463,211
MATERIAL SERVING HEAD

Filed Jan. 27, 1948  2 Sheets-Sheet 1

INVENTOR
G. C. SPILLMAN
BY
ATTORNEY

March 1, 1949. G. C. SPILLMAN 2,463,211
MATERIAL SERVING HEAD
Filed Jan. 27, 1948 2 Sheets-Sheet 2

INVENTOR
G. C. SPILLMAN
BY
ATTORNEY

Patented Mar. 1, 1949

2,463,211

UNITED STATES PATENT OFFICE 2,463,211

MATERIAL SERVING HEAD

Gordon C. Spillman, Roselle, N. J., assignor to Western Electric Company, Incorporated, New York, N. Y., a corporation of New York Application January 27, 1948, Serial No. 4,620

3 Claims. (Cl. 57—16)

This invention relates to material serving heads, and more particularly to apparatus for serving tape-like materials to advancing cores.

In the manufacture of electrical cables, a selected group of insulated electrical conductors are advanced simultaneously, formed into a core of a given cross-sectional contour and provided with spiral wrappings of suitable material such as paper during relative rotation of the serving head or apparatus and the core. Predetermined tensions are created in the materials and it is important that these tensions be maintained equal and constant to create a uniform lay of the materials on the core and to avoid breaking the materials during the serving operation. When two or more materials such as paper tapes are served simultaneously to the core, these materials are frequently applied in superimposed layers, resulting in the feeding of one material at a faster rate of speed than the other material in that one material is applied directly to the core while the other material is wrapped spirally on the first material applied to the core. In such instances, it has been difficult to maintain uniform tensions in the materials, unbalanced tensions creating irregularities in the materials on the core.

An object of the present invention is to provide a material serving head which is simple in structure and highly efficient in serving a plurality of materials to an advancing core and maintaining uniform tensions in the materials while being served to the core.

With this and other objects in view, the invention comprises a hollow spindle through which a core is advanced longitudinally. Supports for supplies of materials to be served to the core are mounted on the spindle to rotate in opposite directions, and a brake means is interposed between the supports to apply a given braking force to the supports to create uniform tensions in the materials served to the core during relative rotation of the core and the serving head.

More specifically, the braking means includes brake elements rotatable relative to each other with their respective supports and urged toward each other by a variable force to create a predetermined variable tension in each material. Guide pins for the material are supported by a control which is rotated with respect to the brake means by excess tension in either material. This rotation momentarily reduces the force on the braking elements and the braking force on the materials to restore the tensions to the proper value.

Figure 2:
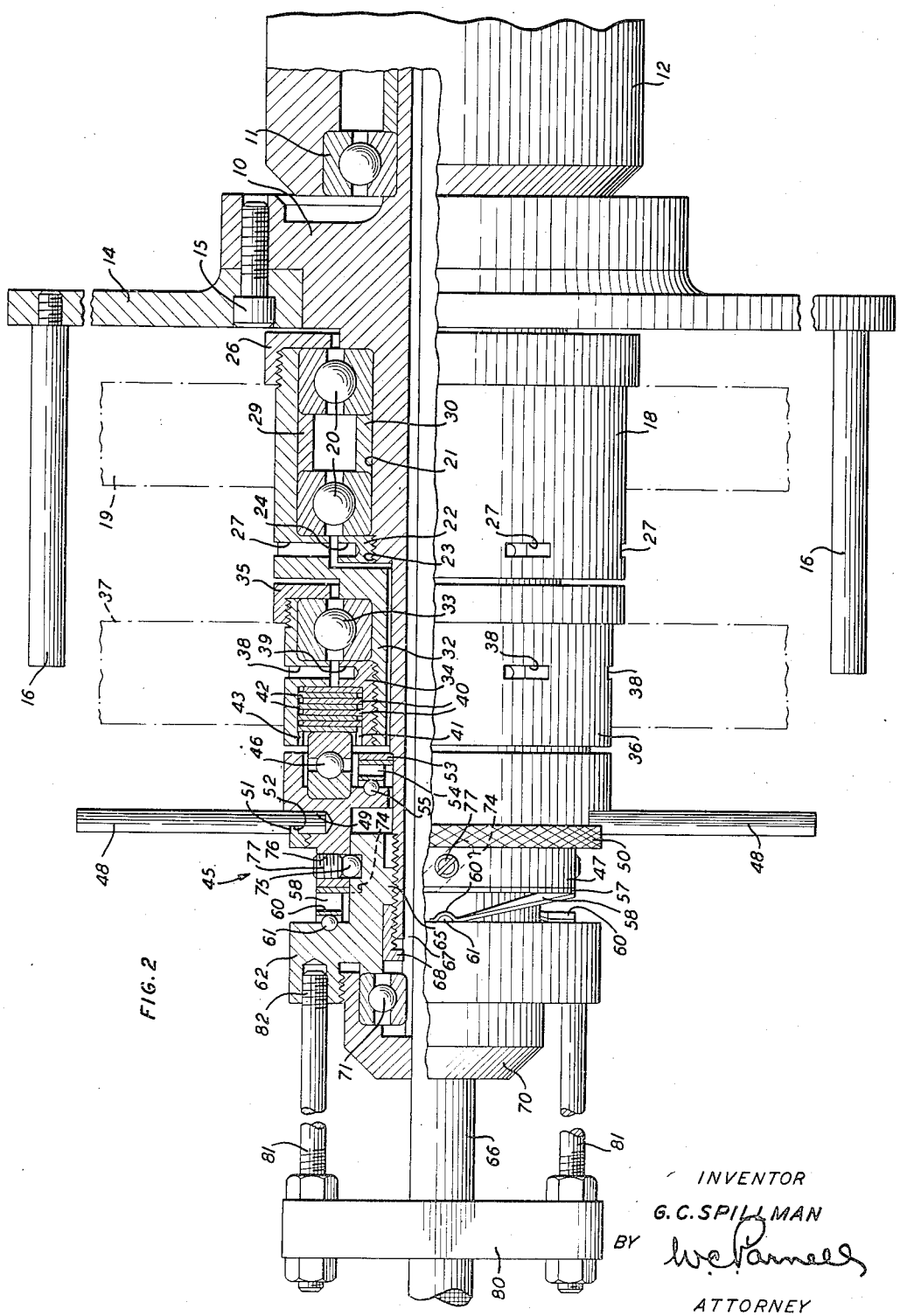

Other objects and advantages will be apparent from the following detailed description when considered in conjunction with the accompanying drawings, wherein Fig. 1 is an isometric view of the apparatus or serving head, illustrating its application of tape-like materials to an advancing core, and Fig. 2 is a side elevational view of the apparatus or serving head, a portion thereof being shown in section.

Referring now to the drawings, attention is first directed to Fig. 2 which illustrates a hollow spindle 10, suitably journalled in bearings 11, only one of which is shown, mounted in a stationary bracket 12. An annular bracket 14 is mounted on the spindle 10 by screws 15 and carries a plurality of spaced guide pins 16 as illustrated also in Fig. 1. A rotatable support 18 for a supply of material 19 is disposed concentric with the spindle 10 and is rotatably mounted on bearings 20 supported by a portion 21 of the spindle 10. A retaining ring 22 is mounted on a threaded portion 23 of the spindle and has a plurality of apertures 24 about its periphery to receive a suitable tool to cause rotation thereof in the assembly of the serving head.

The supporting element 18 has an annular stop or end member 26 threadedly mounted thereon for the pad or supply of material 19 to lie against. Slots 27 are provided in the element 18 at spaced positions about its periphery through which a suitable tool may be inserted to actuate the retaining ring 22 moving it relative to the bearings 20 to locate them properly relative to each other and their spacing members 29 and 30. The support 18 has a reduced portion 32, a part of which has a smooth surface to support a bearing 33, the other part being threaded to receive a retaining element 34. The bearing 33 rotatably supports an annular supporting element 36 for a pad or supply of material 37. An annular stop or end member 35 is threadedly mounted on the right end of the supporting element against which the material 37 will lie. Slots 38 similar to the slots 27 are formed in the supporting element 36 at spaced positions about its periphery whereby access may be had to apertures 39 in the retaining element 34 to rotate it relative to the portion 32 of the supporting element 18. A plurality of brake elements 40 annular in general contour are connected to the retaining member 34 by portions extending into spaced slots 41 in the retaining member. Similar brake elements 42 are alternately positioned with respect to the brake elements 40 and are connected to the supporting element 36 by having portions thereof extending into spaced slots 43 in the inner surface of the supporting element 36. In this manner, a brake mechanism composed primarily of the brake elements 40 and 42 is interposed between the supporting elements 18 and 36 for the pads or supplies of materials 19 and 37.

A control unit indicated generally at 45 is mounted concentric with the spindle 10 for rotation therewith. A thrust bearing 46 is interposed between an annular control element 47 of the unit 45 and the brake elements 40 and 42. Guides 48 in the form of pins have their inner ends nested in apertures 49, disposed at diametrically opposed positions in the element 47, and removably held in place by a retaining ring 50 threadedly mounted on the element 47 and having an annular flange 51 to enter notches 52 in the guides 48. It is necessary for the guides 48 to be removable with little effort in order to mount the pads or supplies of material 19 and 37 on their respective supports 18 and 36. The guides 48 may be removed readily by turning the retaining ring 50 until the flange 51 thereof is free of the notches 52 in the guides, after which the guides may be removed to be again inserted in place after the serving head has been loaded with new supplies of materials.

Spring units are provided at each side of the control element 47. The smaller spring unit includes an annular member 53 positioned concentric with the spindle 10 at a reduced portion of the spindle where a shoulder is provided to be engaged by the annular member. Arcuate resilient members or springs 54 are secured at spaced positions to the annular member 53 and provided with cupped outer ends to engage ball members 55 partially embedded in recesses of the adjacent portion of the element 47. The major spring unit includes an annular member 57 similar in structure but larger than the annular member 53 positioned to engage the lift end of the control element 47. Arcuate resilient members or springs 58 are securely mounted at spaced positions on the annular member 57 and extend outwardly therefrom, in the same manner as the resilient members 54 extend away from their annular member 53, where their outer ends are cup-shaped as indicated at 60 to engage ball members 61 partially embedded in spaced recesses in a cam element 62. The control element 47 is positioned between the spring units, the larger or outer spring unit overpowering the inner or smaller spring unit to apply a predetermined force to the brake elements 42, through the control element 47 and the thrust bearing 46, to create a given brake drag between the supports for the materials to create like known tensions in the materials. To vary the tensions created in the materials by the brake mechanism interposed between the supports 18 and 36, the operator may adjust the annular member 34 relative to the portion 32 of the support 18 to move the brake elements relative to the control unit 45.

The cam element 62 is threadedly mounted at 65 on an outer threaded portion of the spindle 10 and may be adjusted relative to the brake elements 42 to assist in varying the predetermined tension to be created in the materials to be served in an advancing core 66. A tubular member 67 or lining extends through the spindle 10 and it is through this structure that core 66 advances longitudinally. The cam element 62 is locked in any desired position on the spindle 10 by a nut or threaded member 68. A cover 70 is threadedly disposed in the outer end of the cam element 62. A bearing 71 interposed between the cover and the tubular member 67 is provided to support the adjacent structure including the tubular member 67. Diagonally extending recesses 74 are formed in the cam element 62 at spaced positions about its periphery to function as cooperating cams to move the control unit 45 relative to the brake elements 40 and 42 during variations in the tensions in the materials 19 and 37. Ball members 75 partially disposed in the cam grooves 74 also extend into apertures 76 of the control element 47 where they are held in place by screws 77 to form positive yet substantially frictionless connections between the control element 47 and the cam element 62. A die 80 supported by rods 81 extending from their threaded connections 82 in the cam element 62 is centrally apertured at 83 for the core 66 with its spiral wrappings of the materials 19 and 37 to pass through.

In preparing the apparatus or serving head for operation full pads or supplies of materials 19 and 37 are mounted on their respective supports 18 and 36, after which the guides 48 are inserted in place and the materials individually threaded to the core 66 as illustrated in Fig. 1. The material 19 from the innermost pad or supply of material is extended around the first of its group of guide pins 16 as illustrated at the bottom of Fig. 1 and then directed in a substantially reversed direction about the remaining guide pins 16 of its group after which the leading end of the material 19 is directed about its respective guide 48 and secured in a conventional manner to the core 16 between the cover 70 and the die 80. The leading end of the material 37 is then directed about its guide pin 16, its respective guide 48, and secured in a conventional manner to the core 66. In the present embodiment of the invention, the serving head is rotated relative to the core while the core is advanced longitudinally. It should be understood that the materials could be served spirally to the core while the serving head remains stationary and the core is rotated during its longitudinal movement. In either instance, the supports 18 and 36 are rotated in opposite directions relative to each other causing similar relative rotations of their respective brake elements 40 and 42. By applying a known pressure to the brake elements, the force originating in the larger spring unit including the springs 58 and extending through the control unit 45, including the element 47 and the thrust bearing 46, to the brake elements 40 and 42, a predetermined brake drag will be created between the supplies of material or the supports therefor creating like known tensions in the materials. If the tension in either or both materials should increase beyond the predetermined tension, force will be applied to one or more of the guides 48 to cause rocking motion of the control element 47 in a direction to cause the ball members 75 to ride up their respective cams moving the control element 47 and its thrust bearing 46 away from the brake elements 40 and 42 to reduce or momentarily remove the brake drag existing between the material supports 18 and 36, whereby the excess tension in either or both materials will be removed. When this condition exists the control element 47 will return to its normal position urged by the springs 58 overpowering the opposing forces of the springs 54, due to the slackened condition in each material resulting from the momentary removal of the braking force. This controlling function exists throughout the operation of the serving head to maintain the constant known tensions in the materials. The provision of a single brake unit interposed between the rotatable supports for the materials assures balanced tension in the materials. Furthermore, an increase in tension in one material causing an increase in tension in the other material, increases the action of the control unit through their guides 48 to hasten the removal of the excess tension from the materials and to maintain uniform lay of the materials on the core.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A serving head for materials to be served spirally to an advancing core during relative rotation of the serving head and the core, the serving head comprising rotatable supports for supplies of materials to be served to the core, brake elements rotatable in opposite directions with their respective supports rotated by the pulling off of the materials therefrom, spring means to apply a given force to the brake elements to force them into engagement with each other to create given like tensions in the materials served to the core, and means under the control of the materials actuable to reduce the said force when excess tension appears in either material.

2. An apparatus for serving materials to an advancing core during relative rotation of the apparatus and the core, the apparatus comprising supports for supplies of materials rotatable in opposing directions during serving of the materials to the core, a single brake unit connecting the supports to apply a given brake drag to the supports to create like tensions in the materials, a control unit normally held at a given position relative to the brake unit to apply a predetermined force thereto to maintain predetermined tensions in the materials, and guides for the materials carried by a control unit and movable with the control unit by either material when excess tension exists therein to remove the force from the brake unit to remove the excess tension from the said material.

3. A serving head for materials to be served spirally about an advancing core, the serving head comprising a rotatable hollow spindle through which the core is advanced longitudinally, supports for supplies of materials mounted on the spindle for rotation in opposite directions, brake elements for the supports rotatable therewith and frictionally engaging each other, a control element mounted on the spindle for rotation therewith, means to cause the control element to apply a predetermined force to the brake elements whereby predetermined like tensions will be created in the materials, guides for the materials carried by the control element and movable therewith about the axis of the spindle by either material when excess tension exists therein, and cam means to force the control element away from the brake elements during its movement relative to the spindle to remove the force from the brake elements to remove the excess tension from the said material.

GORDON C. SPILLMAN.

REFERENCES CITED

The following references are of record in the file of this patent:

UNITED STATES PATENTS

| Number | Name | Date |
| --- | --- | --- |
| 1,857,820 | Rice | May 10, 1932 |
| 2,364,984 | Larsen et al. | Dec. 12, 1944 |